(12) United States Patent
Teague

(10) Patent No.: US 8,095,141 B2
(45) Date of Patent: *Jan. 10, 2012

(54) USE OF SUPPLEMENTAL ASSIGNMENTS

(75) Inventor: Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 894 days.

This patent is subject to a terminal disclaimer.

(21) Appl. No.: 11/142,121

(22) Filed: May 31, 2005

(65) Prior Publication Data

US 2006/0205414 A1    Sep. 14, 2006

Related U.S. Application Data

(60) Provisional application No. 60/659,971, filed on Mar. 9, 2005.

(51) Int. Cl.
*H04W 72/00* (2009.01)

(52) U.S. Cl. ............... 455/452.1; 455/450; 455/464; 370/329

(58) Field of Classification Search ............... 455/452.1, 455/450, 464; 370/329
See application file for complete search history.

(56) References Cited

U.S. PATENT DOCUMENTS

| | | | |
|---|---|---|---|
| 5,583,869 A | 12/1996 | Grube et al. | |
| 5,594,738 A | 1/1997 | Crisler et al. | |
| 5,949,814 A | 9/1999 | Odenwalder et al. | |
| 6,138,037 A * | 10/2000 | Jaamies | 455/560 |
| 6,226,280 B1 | 5/2001 | Roark et al. | |
| 6,317,435 B1 | 11/2001 | Tiedemann, Jr. et al. | |
| 6,377,809 B1 | 4/2002 | Rezaiifar et al. | |
| 6,393,008 B1 * | 5/2002 | Cheng et al. | 370/338 |
| 6,483,820 B1 * | 11/2002 | Davidson et al. | 370/329 |
| 6,625,172 B2 | 9/2003 | Odenwalder et al. | |
| 6,690,951 B1 | 2/2004 | Cuffaro et al. | |
| 6,721,568 B1 | 4/2004 | Gustavsson et al. | |
| 6,799,043 B2 | 9/2004 | Tiedemann, Jr. et al. | |
| 6,934,275 B1 * | 8/2005 | Love et al. | 370/342 |
| 6,940,842 B2 * | 9/2005 | Proctor, Jr. | 370/335 |
| 6,963,543 B2 | 11/2005 | Diep et al. | |
| 6,975,868 B2 | 12/2005 | Joshi et al. | |
| 6,980,540 B1 * | 12/2005 | Laroia et al. | 370/345 |
| 7,085,574 B2 | 8/2006 | Gaal et al. | |
| 7,120,134 B2 | 10/2006 | Tiedemann, Jr. et al. | |
| 2002/0061742 A1 * | 5/2002 | Lapaille et al. | 455/414 |

(Continued)

FOREIGN PATENT DOCUMENTS

CN    1252919    5/2000
(Continued)

OTHER PUBLICATIONS

International Search Report—PCT/US06/008455, International Search Authority—European Patent Office, Jul. 5, 2006.

(Continued)

*Primary Examiner* — Nghi Ly
(74) *Attorney, Agent, or Firm* — Donald C. Kordich

(57) ABSTRACT

Systems and methodologies are described that facilitate dynamically supplementing resource assignments to mobile devices in a wireless network environment without requiring transmission of replacement assignments. Supplemental assignments can be generated based on information related to mobile device need and resource availability. Additionally, assignment validation can be performed to mitigate generation of conflicting resource assignment to multiple devices. Moreover, resource assignments can be persisted for a mobile device.

41 Claims, 13 Drawing Sheets

U.S. PATENT DOCUMENTS

| | | | |
|---|---|---|---|
| 2002/0085521 A1 | 7/2002 | Tripathi et al. | |
| 2003/0220101 A1* | 11/2003 | Castrogiovanni et al. | 455/419 |
| 2005/0030964 A1 | 2/2005 | Tiedemann, Jr. et al. | |
| 2005/0034079 A1* | 2/2005 | Gunasekar et al. | 715/753 |
| 2005/0044206 A1 | 2/2005 | Johansson et al. | |
| 2005/0159162 A1* | 7/2005 | Park | 455/450 |
| 2007/0211668 A1* | 9/2007 | Agrawal et al. | 370/335 |
| 2007/0242653 A1 | 10/2007 | Yang et al. | |
| 2009/0022098 A1 | 1/2009 | Novak et al. | |
| 2009/0285163 A1 | 11/2009 | Zhang et al. | |

FOREIGN PATENT DOCUMENTS

| | | |
|---|---|---|
| DE | 10240138 | 8/2003 |
| EP | 1180907 A2 | 2/2002 |
| EP | 1465449 A1 | 10/2004 |
| JP | 11191756 A | 7/1999 |
| JP | 2001156732 A | 6/2001 |
| JP | 2001521698 | 11/2001 |
| RU | 2003117017 | 12/2004 |
| WO | WO 98/37706 | 8/1998 |
| WO | 9848581 | 10/1998 |
| WO | 0245456 | 6/2002 |
| WO | WO 2004/023834 | 3/2004 |
| WO | WO2004077850 | 9/2004 |
| WO | WO2005025110 A2 | 3/2005 |

OTHER PUBLICATIONS

International Search Report—PCT/US06/021207 International Search Authority—European Patent Office, Sep. 21, 2006.

Written Opinion—PCT/US06/008455, International Search Authority—European Patent Office, Jul. 5, 2006.

International Preliminary Report on Patentability—PCT/US06/008455, The International Bureau of WIPO, Geneva, Switzerland—Sep. 12, 2007.

European Search Report—EP10010903, Search Authority—Berlin Patent Office, Oct. 26, 2010.

* cited by examiner

| | |
|---|---|
| 1 | 1-5 |
| 2 | 2, 3, 7-20 |
| 3 | 6-8, 17 |
| ... | |
| M | 16 |

USE OF SUPPLEMENTAL ASSIGNMENTS

CLAIM OF PRIORITY UNDER 35 U.S.C. §119

The present Application for Patent claims priority to Provisional Application No. 60/659,971 entitled "USE OF SUPPLEMENTAL ASSIGNMENTS" filed Mar. 9, 2005, and assigned to the assignee hereof and hereby expressly incorporated by reference herein.

BACKGROUND

I. Field

The following description relates generally to wireless communications, and more particularly to dynamically managing network resources by providing supplemental resource assignments that facilitate reducing assignment message size.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

For example, it can be expensive (e.g., bit-wise, . . . ) to precisely describe channel assignments in a wireless networking environment. Such can be especially true when users (e.g., mobile devices) are not required to be aware of system resource assignments to other users of the wireless system. In such cases, assignments of system resources, such as broadcast channels an the like can require updating on virtually every broadcast cycle in order to provide each user with adequate bandwidth and/or networking power, which can tax the wireless network system and expedite realization of network limitations. Additionally, by requiring such continuous updates and/or complete reassignment messages to be transmitted to users so frequently, such conventional methods of system resource allocation can require expensive and high-powered communication components (e.g., transceivers, processors, . . . ) just to meet system demand.

Multiple-access communication systems typically employ methods of assigning system resources to the individual users of the system. When such assignments change rapidly over time, system overhead required just to manage the assignments can become a significant portion of the overall system capacity. When assignments are sent using messages that constrain the assignment of resource blocks to a subset of the total possible permutations of blocks, assignment expense can be reduced somewhat, but by definition, assignments are constrained. Further, in a system where assignments are "sticky" (e.g., an assignment persists over time rather than having a deterministic expiration time), it can be difficult to formulate a constrained assignment message that addresses an instantaneous available resources.

In view of at least the above, there exists a need in the art for a system and/or methodology of improving assignment notification and/or updates and reducing assignment message overhead in wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with managing system resources and satisfying user needs in a wireless network environment. According to one aspect, supplemental assignments can be employed to augment "sticky" assignments (e.g., assignments that are valid until a next assignment signal is received). Conventional sticky assignments can be restrictive (e.g., incapable of assigning arbitrary sets of resource blocks, . . . ). The described supplemental assignments can facilitate assigning instantaneously available system resources as well as providing a more robust user experience at reduced overhead cost than can be achieved by conventional systems and/or methodologies. In accordance with another embodiment, a method of dynamically allocating system resources in a wireless networking environment can comprise transmitting a non-supplemental assignment to at least one mobile device connected to a wireless network to assign an initial set of resources to the at least one mobile device, determining whether the at least one mobile device requires additional resources, generating a supplemental resource assignment that assigns at least one additional resource to the at least one mobile device, and transmitting the supplemental assignment to the at least one mobile device to augment a resource set assigned to the at least one mobile device. The method can further comprise verifying receipt of an assignment at the mobile device prior to transmission of the supplemental assignment.

In another aspect, a system that facilitates supplementing resource assignments for mobile devices is described. The system can include an assignment component that generates non-supplemental resource assignments for a plurality of respective mobile devices, and a supplemental component that receives information related to increased resource requirements of at least one of the plurality of mobile devices and generates a supplemental assignment to allocate additional resources to satisfy the increased resource requirements of the at least one mobile device. The system can further include a transceiver that transmits assignment messages to the plurality of mobile devices. Moreover, assignments can be persistent, or "sticky," such that they are persisted at the mobile device until receipt of a subsequent non-supplemental resource assignment.

In yet another aspect, an apparatus that facilitates wireless network resource management can comprise means for generating a persistent initial resource assignment that assigns resources to a mobile device and means for detecting whether resources assigned to the mobile device are sufficient at a given point in time, means for generating a supplemental resource assignment to accommodate detected resource insufficiency at the mobile device, and means from transmitting resource assignments to the mobile device. Additionally, the apparatus can include means for verifying assignment receipt by the mobile device to ensure that a supplemental resource assignment thereto supplements the intended initial resource assignment.

To the accomplishment of the foregoing and related ends, the one or more embodiments comprises the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
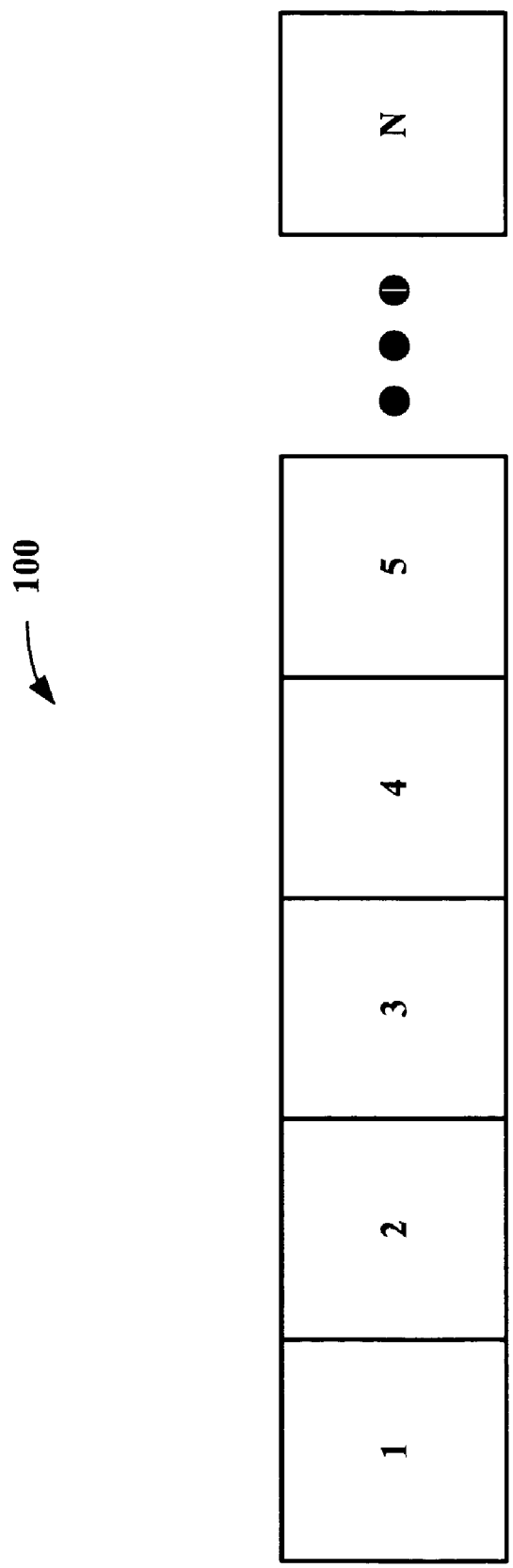
FIG. 1 illustrates a group of N system resource blocks in order to facilitate understanding of a manner in which various embodiments presented herein can operate.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to the drawings, FIG. 1 illustrates a group of N system resource blocks 100 in order to facilitate understanding of a manner in which various embodiments presented herein can operate. Such resource blocks 100 can be, for instance, time slots, frequencies, code slots, a combination of the preceding, etc. A general description of a subset of such blocks can be, for example, a block index list, such as a list of blocks assigned to a particular user. For example, an index list such as {2, 3, 10, 11, 12, 13} could be employed to represent that the user is assigned such blocks. Alternatively, a Boolean array can be employed to describe the same assignment, such as an array of N bits {01100000011110}. Conventional systems employing such assignment mechanisms will realize significant expense in doing so, albeit with different properties. For instance, a block index list can be substantially more expensive with regard to a number of bits required to convey such assignments as a subset of blocks to be assigned grows in size. The Boolean array, on the other hand, exhibits a somewhat fixed expense regardless of the number of 1s and 0s, but the expense is relatively large, especially as N grows.

Additionally, in cases where assignments are restricted to contiguous sets of blocks, or resources, such assignments can be signaled by indicating a first block in the assignment and a total number of blocks in the assignment. For example, a block index assignment such as {11, 12, 13, 14, 15} can be signaled as {11, 5}, where "11" represents a first block to be assigned to a given user and "5" represents the total number of contiguous blocks to be assigned, of which 11 is the first block. Still furthermore, if an ordering of users is known, then an assignment signal can be transmitted without user information. For instance, only the number of blocks being assigned need be signaled so long as all users are aware of the assignments for all other users. For instance, if assignments for users 1-3 are represented by {user 1: 1-5}, {user 2: 6-7}, and {user 3: 8-12}, and if all users are aware of their respective user numbers, such an assignment can be written as {5, 2, 5}. However, this arrangement requires that all users on the system are aware of the assignments to all other users since, for example, user 2 cannot know that its assignment begins with block 6 unless it knows that user 1 has been assigned blocks 1-5. Thus, it can be seen that systems employing such conventional methods of assigning system resources can be expensive to implement and can incur a substantial burden on system transmission resources in which they are implemented. As will be seen the systems and methods described herein facilitate surmounting such conventional burdens.

Figure 2:
FIG. 2 is an illustration of a channel table that can be employed in a wireless networking system to facilitate assigning system resources that comprises a plurality of users (e.g., devices) and their respective resource assignments.

FIG. 2 is an illustration of a channel table 200 that can be employed in a wireless networking system to facilitate assigning system resources (e.g., transmission channels, time slots, code slots, frequencies, . . . ), which comprises a plurality of users (e.g., devices) and their respective resource assignments. Such a table 200 can be known to all users, which can employ the channel table indices to interpret assignment messages. For example, according the table 200, an assignment such as {user 1: index 2} can be written, which can reduce assignment signal expense when compared to block index and/or Boolean array techniques. The following table sets forth a summary of conventional assignment mechanism characteristics with their relative benefits and consequences.

| Method | Restrictive | Expense | All users must view all assignments |
| --- | --- | --- | --- |
| Block index list | No | High | No |
| Contiguous block | Yes | Medium | No |
| Boolean array | No | High | No |
| Known user order | Yes | Low | Yes |
| Channel table | Yes | Medium | No |

Thus, it can be seen that typical assignment allocation schemes do not provide a mechanism that is both cheap and non-restrictive and which does not require all users on a system to view all user assignments.

Figure 3:
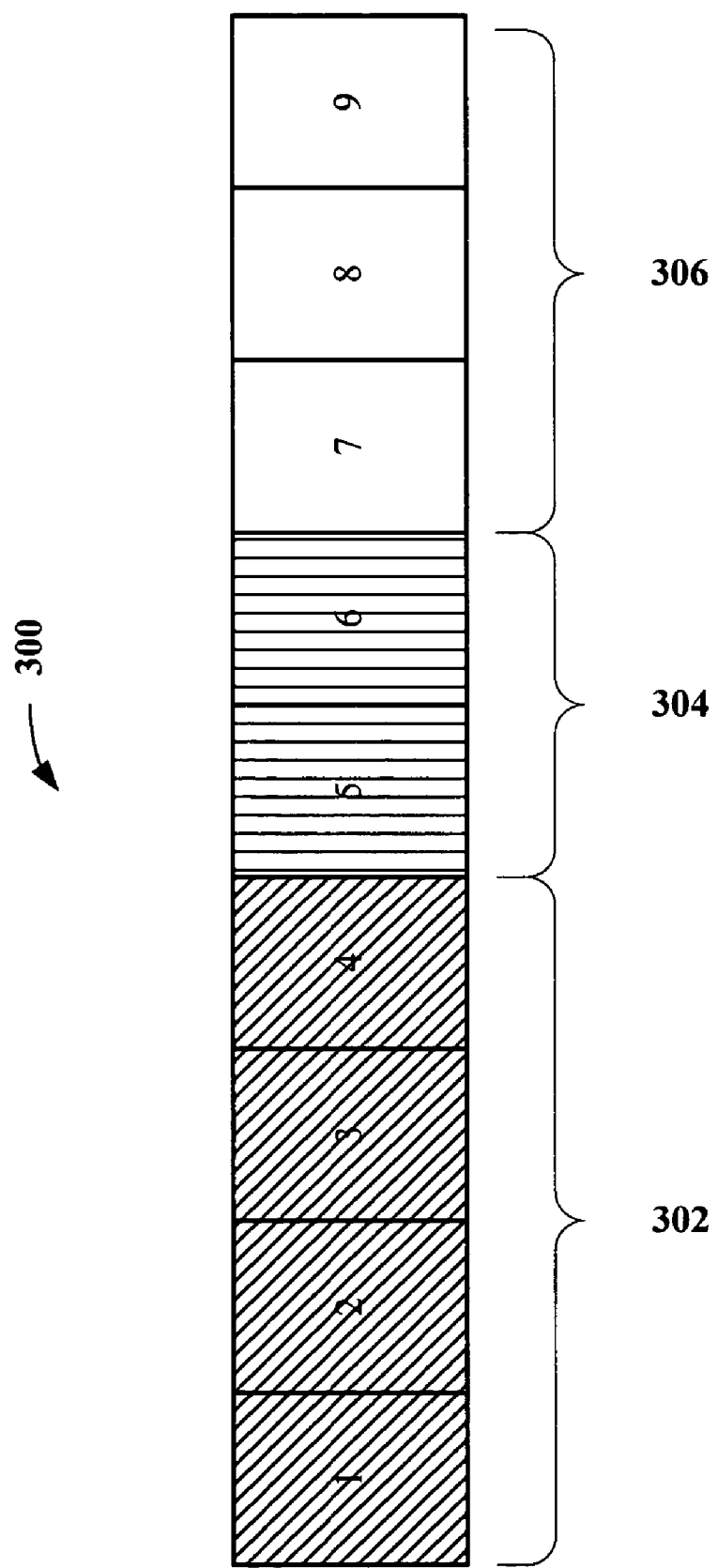
FIG. 3 illustrates a group of resource blocks that can be allocated to a plurality of users.

FIG. 3 illustrates a group of resource blocks 300 that can be allocated to a plurality of users. Such resources can include, for example, system channels, time slots, frequencies, code slots, and the like. According to an embodiment, sticky assignments (e.g., assignments that are valid until a further assignment signal is received) can be employed to assign system resources in, for example, wireless communication networks (e.g., OFDM, OFDMA, CDMA, TDMA, GSM, . . . ). Such assignments can also be restrictive, such that signal expense is reduced at a cost of limiting ability to arbitrarily assign sets of resource blocks. In order to overcome such restrictions while minimizing allocation signal expense, supplemental assignments can be employed to manage system resources and meet user resource needs. For example, the resource blocks 300 can comprise a first block set 302 that contains blocks 1-4 that are assigned to user 1. User 2 can be assigned a second block set 304 that comprises blocks 5 and 6. Finally, blocks 7-9 can comprise a block set 306 that consists of unused blocks. It can be determined that the requirements of user 1 have increased to a point that user 1 requires additional resource blocks. According to this aspect, a supplemental assignment can be generated that can augment user 1's current assignment rather than completely replacing it. For example, a designating bit can be incorporated into the supplemental assignment to tag the assignment as a supplemental assignment so that a recipient device can recognize it as such. If the designator bit is set to "supplemental," then a channel or resource described by the message can be added to the previously held assignment of the user. If the designator bit is nor set to "supplemental," then the message can be construed to replace the previous assignment. It will be appreciated by one skilled in the art that other methods of message designation with regard to supplemental/non-supplemental assignments can be employed, and that embodiments described herein are not limited to employing a designator bit, but rather can utilize any suitable designation mechanism, whether implicit or explicit.

For example, user 1's initial sticky assignment can be represented as {1, 2, 3, 4: 0}, where "0" indicates a non-supplemental assignment and channels 1-4 are assigned. Additionally, to mitigate signal transmission expense in cases where assigned channels are contiguous, such a non-supplemental assignment can be represented as [1, 4: 0] where the first integer "1" represents a first assigned channel, and the second integer "4" represents a length of assigned channels. If supplemental channels are to be assigned to user 1 for instance due to increased user needs and the like, then a supplemental assignment can be generated and transmitted to user 1. For example, {7, 8, 9: 1} can represent that channels 7, 8, and 9 are additionally to be assigned to user 1. In this example, the designator bit is set to "1" to indicate that the assignment is supplemental and should not merely replace the previous user 1 assignment of channels 1-4, but rather augment such assignment. Additionally, because the additional channels 7-9 are contiguous, the supplemental assignment can be expressed as [7, 3: 1 ], where 7 is the first supplemental channel assignment, and the length of contiguous supplemental channels to be assigned is 3. According to this latter aspect, assignment signal overhead can be further reduced when compared to conventional systems (e.g., having to transmit a bulky second signal such as {1, 2, 3, 4, 7, 8, 9: 0}).

According to a related aspect, supplemental assignment transmission permissions can be predicated upon validation of a previous assignment to a user (e.g., reception of some validating data, such as a verification message indicating successful packet or sequence decode over a reverse link, an acknowledgement of successful receipt or decode over a forward link, . . . ). In such a manner, a network can validate a user's assignment prior to supplementing such assignment.

Figure 4:
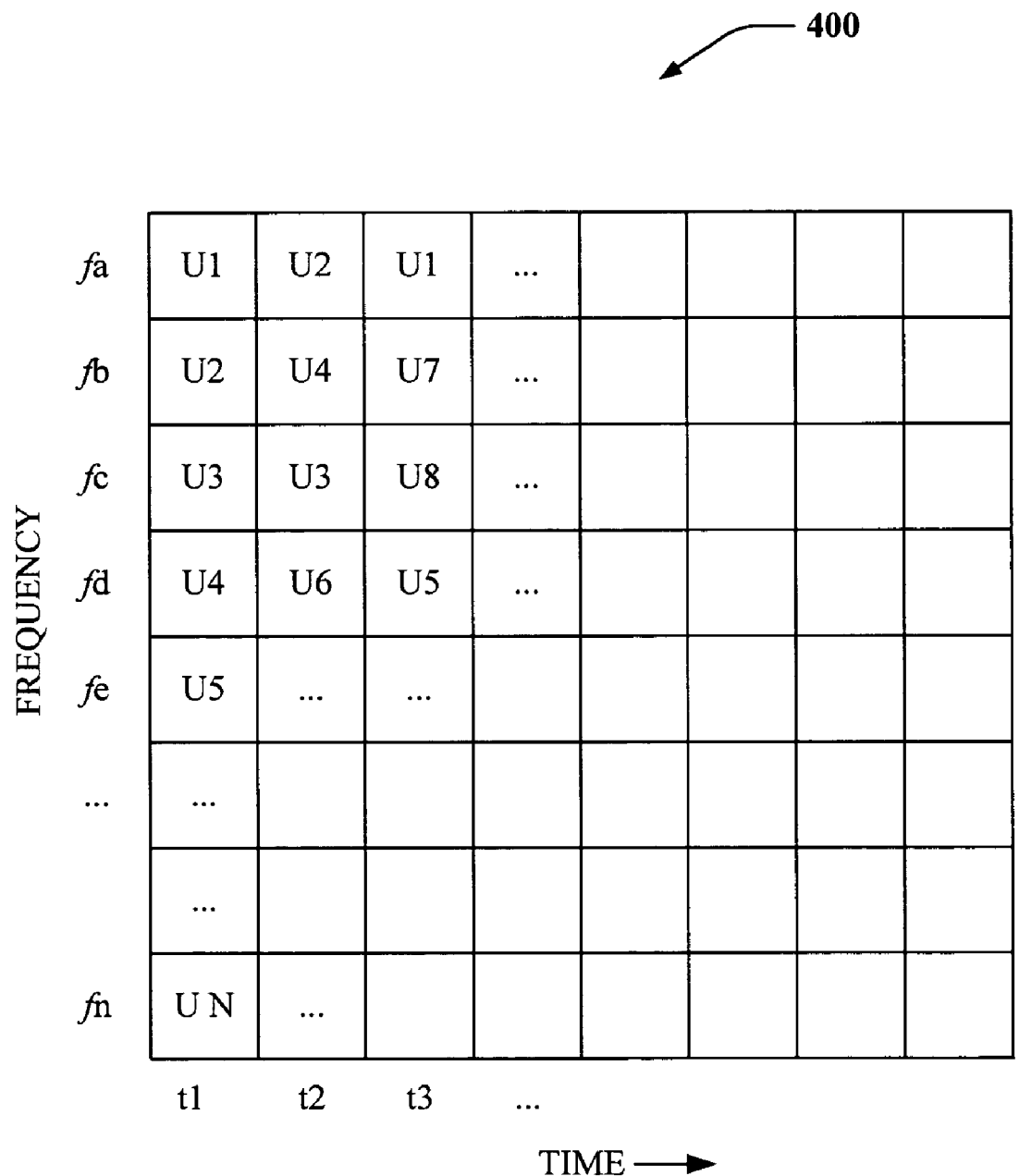
FIG. 4 is an illustration of a series of non-persistent (e.g., non-sticky) assignments made over time.

FIG. 4 is an illustration of a series of non-persistent (e.g., non-sticky) assignments made over time. Frequencies are illustrated as the type of system resource being assigned, although assignable system resources are not limited to being such. According to the Figure, a first user, U1, is assigned frequency A at time 1. At time 2, frequency A can be reassigned to user 2, in part because the initial assignment is not a sticky assignment. Frequency C is illustrated as being assigned to user 3 during both time 1 and time 2. However, because the assignment of frequency C to user 3 is not a sticky assignment, user 3's retention of frequency C can require separate assignments at each of time 1 and time 2, resulting in undesirable increases in assignment signal overhead, which in turn can detrimentally affect system resources. Thus, a system employing non-sticky assignments would require n different assignment messages per time frame to assign n available frequencies to N users.

Figure 5:
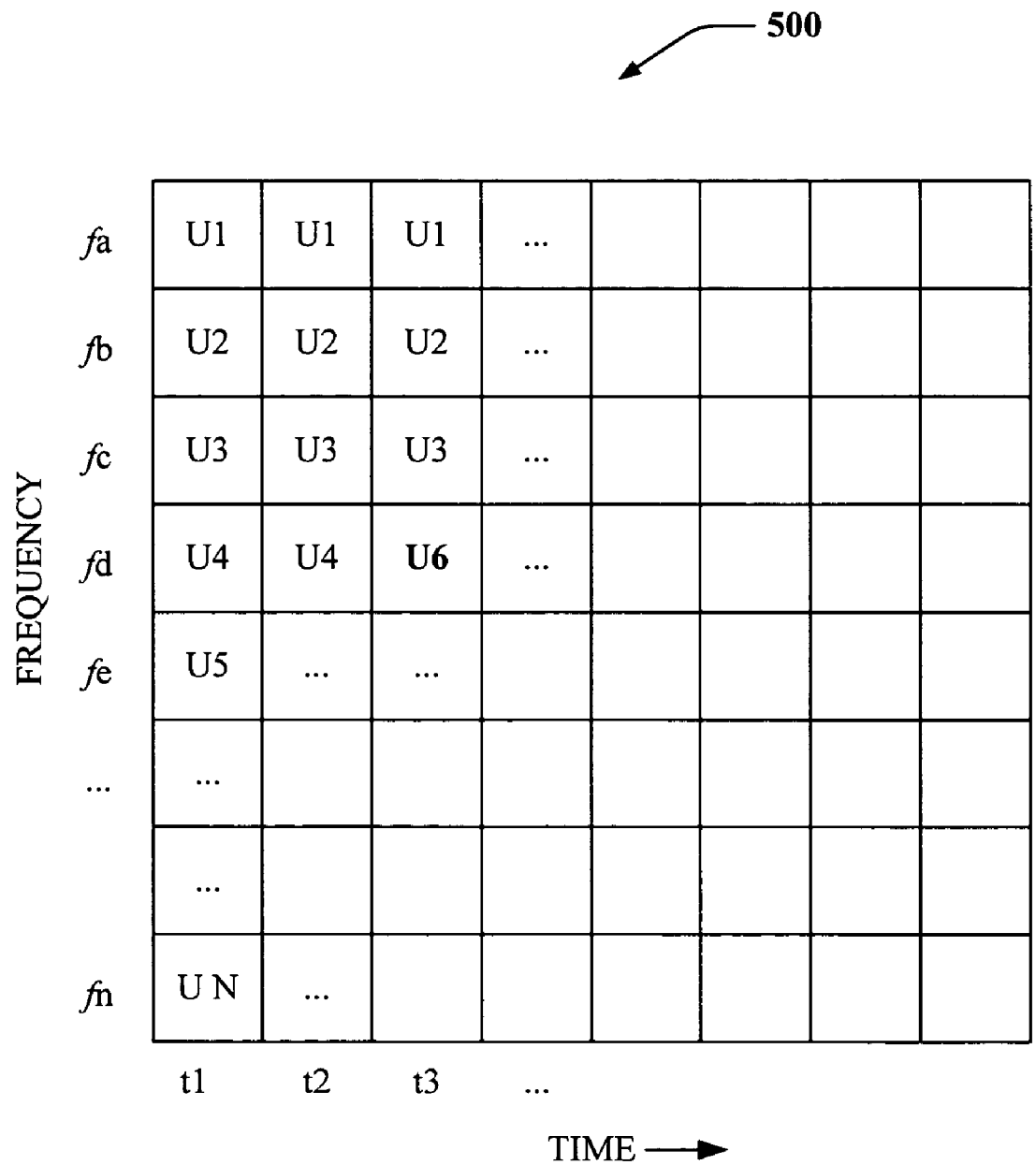
FIG. 5 is an illustration of a series of persistent, or "sticky" assignments made over time, such as can be employed with regard to various embodiments described herein.

FIG. 5 is an illustration of a series of persistent, or "sticky" assignments 500 made over time, such as can be employed with regard to various embodiments described herein. For example, a first set of assignments can be transmitted to users 1-N during a first time frame, and such assignments can persist until one or more subsequent assignments are transmitted to one or more individual users. Thus, the first set of N assignments can suffice to provide system resource assignments to all users until a change in such assignments is desired and/or necessary (e.g., due to user needs, bandwidth availability, . . . ). A subsequent user such as U6 can be assigned frequency D should such frequency become available, as illustrated at t3. In this manner, fewer assignment messages need be transmitted over a network than when employing non-sticky assignments.

Additionally, available system resources can be assigned to any user 1-N should the user require additional resources. For instance, it can be determined that U5 requires additional frequency availability at some time during communication over a network, in addition to frequency E. A subsequent assignment message can be transmitted to U5 to indicate that frequencies E and F are assigned U5. Moreover, in connection with the various embodiments detailed herein, such additional assignment message can be a supplemental assignment to mitigate consumption of network resources when reassigning frequencies to U5.

Figure 6:
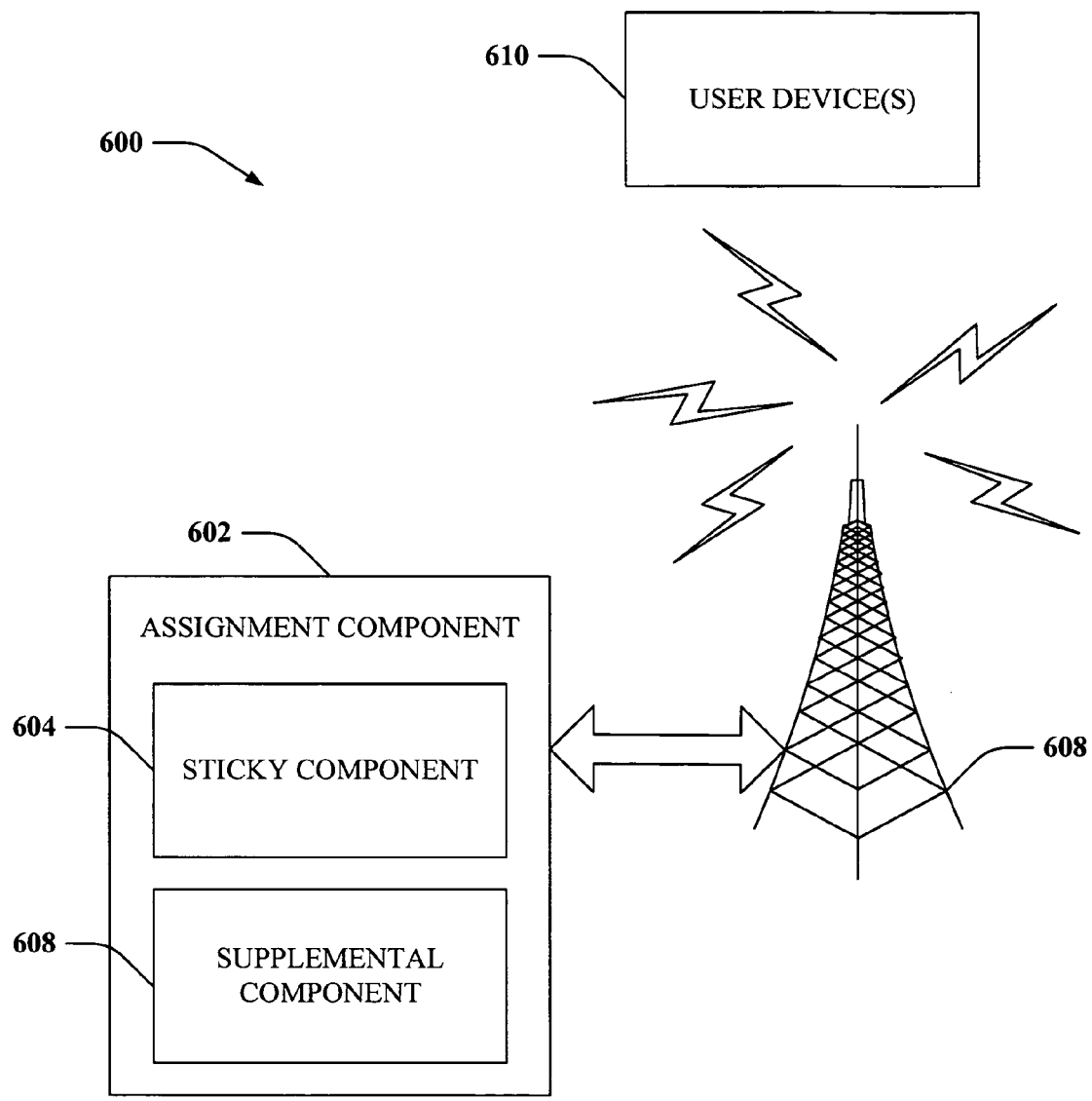
FIG. 6 is an illustration of a system that facilitates employing supplemental assignments to allocate system resources in a manner that reduces system overhead and/or transmission requirements by reducing signal size.

FIG. 6 is an illustration of a system 600 that facilitates employing supplemental assignments to allocate system resources in a manner that reduces system overhead and/or transmission requirements by reducing signal size. System 600 can comprise an assignment component 602 that controls system resource (e.g., channel, frequency, time slot, code slot, . . . ) allocation. Assignment component 602 comprises a sticky component 604 that generates sticky assignments that can be persisted in time until subsequent assignment information is received by a user (e.g., device). Assignment component 602 additionally comprises a supplemental component 606 that generates supplemental assignments to apportion system resources according to user needs as they change. For example, supplemental component 606 can generate one or more supplemental channel assignments to accommodate one or more users whose channel requirements have changed during a communication event. Such assignments can be transmitted through one or more base stations 608 operatively coupled to assignment component 602 to the one or more user devices 610.

According to an example, user device 610 can be initially assigned a subset of available resources, such as {1, 3, 4, 6: 0}. User device 610 can then require additional resources and it can be determined that a resource block or channel, 2, is available. According to an embodiment, a supplemental assignment [2, 1: 1] can be generated and transmitted to the user to add resources beginning with block 2 and having a length of 1 (e.g., channel 2). In this manner, system 600 need not retransmit a bulky complete assignment message (e.g., {1, 2, 3, 4, 6: 0}).

According to another example, a user can be assigned resources 1-4 by assignment component 602 through an assignment such as [1, 4: 0] (e.g., using a block index array, contiguous assignment, . . . ) or the like. Upon an increase in user resource requirements, additional resources can be assigned to the user through a supplemental assignment message. A conventional approach might resubmit a completely new assignment message such as [1, 5: 0] to add resource block 5 to the list of assigned resources for the user. Alternatively, a supplemental assignment can be generated by the supplemental component, such as [5, 1: 1]. However, resource block 5 must be available for the conventional system to be able to employ the reduced message format of the contiguous assignment for resources 1-5, as denoted herein by hard brackets (e.g., "[]"). In the event that resource block 5 is subject to a sticky assignment to another user (e.g., unavailable) system 600 can permit supplemental assignment of resources at reduced overhead cost even when resources are not contiguous. Thus, where non-contiguous resources are available, a conventional system would require an expensive new assignment message such as {1, 2, 3, 4, 6: 0} be generated and transmitted to the user to assign resources 1, 2, 3, 4, and 6. In contrast, supplemental component 606 can generate a supplemental assignment message such as [6, 1: 1], which indicates that the user's assigned resources are to be augmented by a resource allocation beginning with resource 6 and having a vector length of 1. The supplemental resource assignment can then be transmitted by one or more base stations 608 to the user device 610.

According to yet another example, a user who is in an initial stage of a communication event can require a number of system resource blocks. For instance blocks 3, 4, 7, and 8 can be determined to be available by assignment component 602. In such a case, two simple messages can be simultaneously generated and/or transmitted to assign the channels to the user. For example, the messages can be represented as [3, 2: 0] and [7, 2: 1]. Thus, sticky component 604 can generate an initial assignment message and supplemental component 606 can generate a supplemental assignment that can be simultaneously transmitted to the user to assign non-contiguous channels 3, 4, 7, and 8 to the user at reduced cost to system 600. It will be appreciated that the systems and/or methods detailed herein according to various embodiments can be employed in conjunction with systems that employ non-sticky assignments as well sticky assignments.

Figure 7:
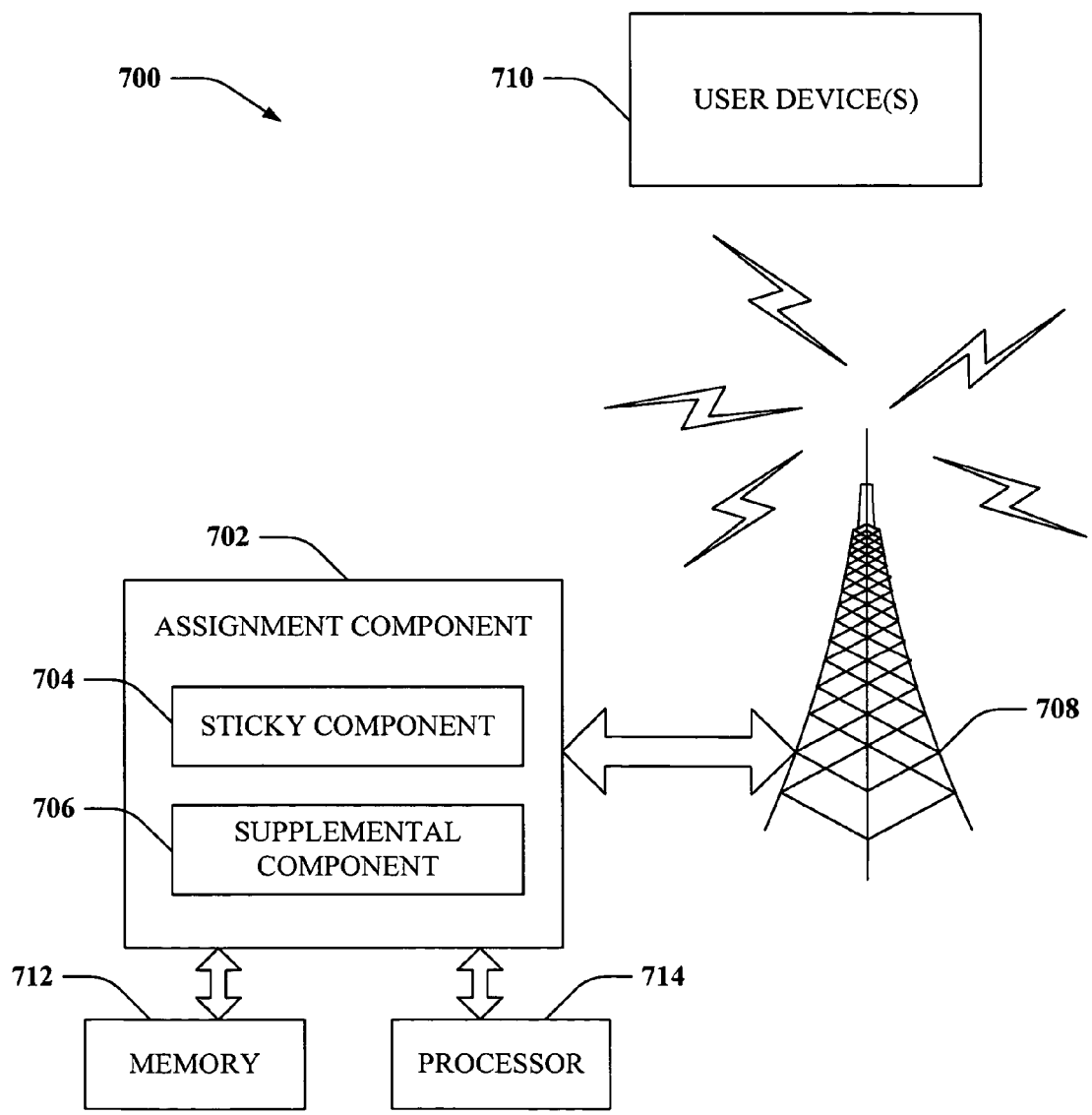
FIG. 7 illustrates a system that facilitates providing supplemental resource assignments to users of a communication network in order to reduce assignment signal overhead cost.

FIG. 7 illustrates a system 700 that facilitates providing supplemental resource assignments to users of a communication network in order to reduce assignment signal overhead cost. System 700 comprises an assignment component 702 that can generate resource assignments for users. Assignment component 702 comprises a sticky component 704 that can selectively generate sticky (e.g., persistent) assignments for users, wherein such assignments are maintained until a subsequent non-supplemental assignment signal resets the user's resource assignments. Assignment component 702 can generate non-sticky assignments if desired, while the use of sticky assignments can facilitate reducing system overhead by mitigating the number of assignment messages required to allocate resources to users of the network. Once assignments have been assigned to users of the network by assignment component 702 and/or sticky component 704, a supplemental component 706 can generate supplemental assignments as need to allocate additional resources to one or more users. Supplemental assignments can allocate recently available resources, such as resources that have been freed due to a particular user terminating a communication session on the network (e.g., completing a cell phone call, a laptop computing session, . . . ). Thus, where conventional systems would require a new, complete sticky assignment, system 700 can generate a supplemental assignment as detailed herein for transmission by one or more base stations 708 to a designated user device 710. User devices 710 can be, for example, cellular phones, laptops, personal digital assistants (PDAs) or any other suitable device for interfacing and/or communication over a wireless network.

System 700 can additionally comprise memory 712 that is operatively coupled to assignment component 702 and that stores information related to user devices 710, system resources, assignments thereof, and any other suitable information related to providing dynamic allocation of system resources (e.g., channels, frequencies, time slots, code slots, . . . ) to one or more users. A processor 714 can be operatively connected to assignment component 702 (and/or memory 712) to facilitate analysis of information related to generating resource assignments and the like. It is to be appreciated that processor 714 can be a processor dedicated to analyzing and/or generating information received by assignment component 702, a processor that controls one or more components of system 700, and/or a processor that both analyzes and generates information received by assignment component 702 and controls one or more components of system 700.

Figure 8:
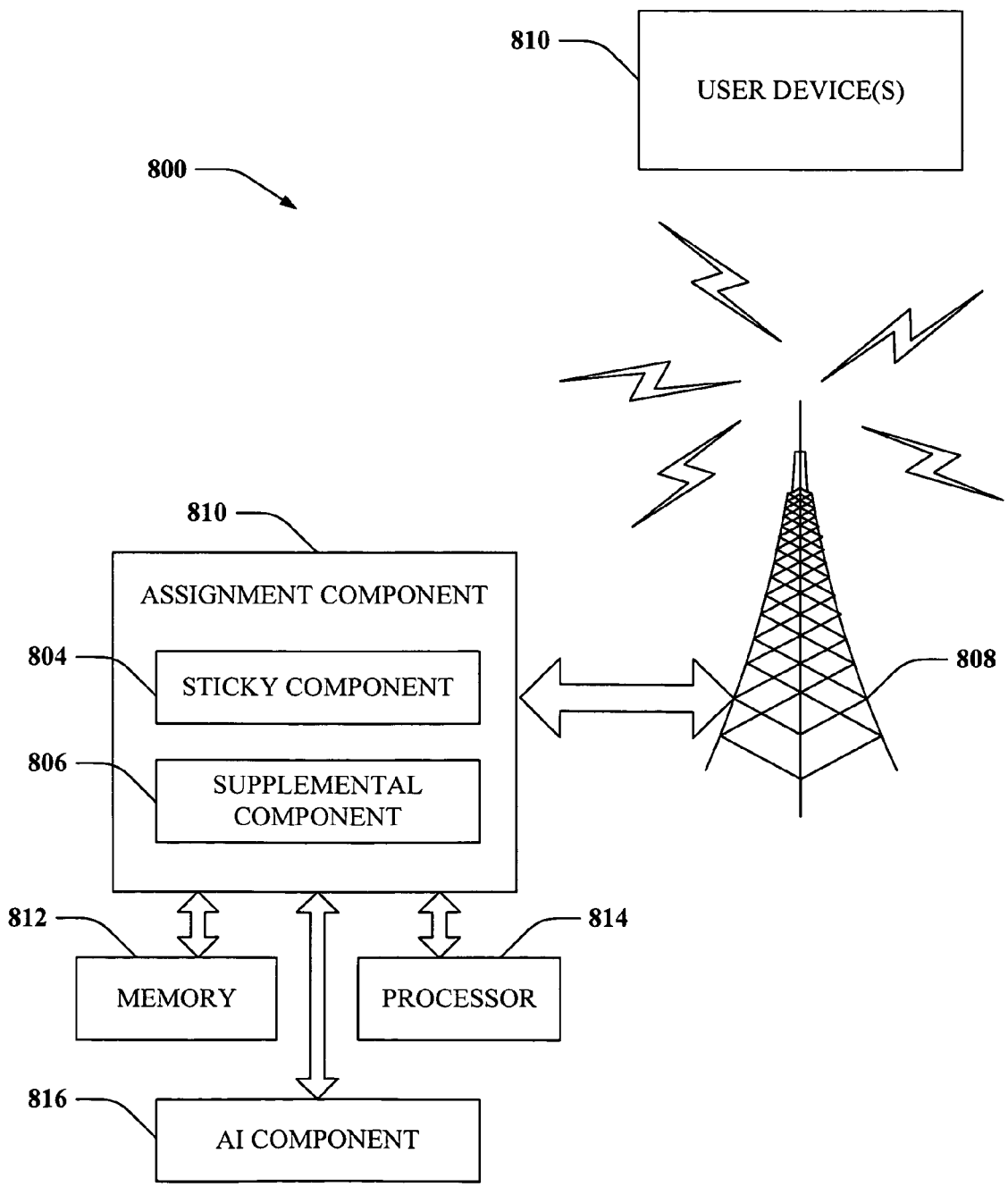
FIG. 8 is an illustration of a system that facilitates generating supplemental assignments to assign system resources to users of a communication network while mitigating resource allocation costs.

Memory 712 can additionally store protocols associated with generating supplemental and/or non-supplemental assignments, etc., such that system 700 can employ stored protocols and/or algorithms to achieve supplemental assignment of system resources as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 712 of the subject systems and methods is intended to comprise, without being limited to, these and any other suitable types of memory FIG. 8 is an illustration of a system 800 that facilitates generating supplemental assignments to assign system resources to users of a communication network while mitigating resource allocation costs. System 800 comprises an assignment component 802 that generates resource assignment signals for transmission through one or more base stations 808 to one or more network user devices 810. Such assignments can by non-sticky (e.g., generated during each time frame). The assignment component comprises a sticky component 804 that generates non-supplemental sticky, or persistent, assignments for devices 810, where such resource assignments are persisted for the user's device 810 until a subsequent non-supplemental assignment message is transmitted to the particular user. By transmitting persistent assignments, sticky component 804 can facilitate reducing a number of assignment messages that need to be sent to users of a network. In order to further reduce transmission costs and assignment message size, assignment component 802 can comprise a supplemental component 806 that generates supplemental assignment messages as described with regard to the preceding figures. Such supplemental assignment messages can comprise a designator bit that informs a receiving device 810 that the message is indeed supplemental and should augment existing resource assignments for the device 810 rather than replace such existing assignments. For instance, a designator bit can be appended to an assignment message by assignment component 802, such that a message in which the designator bit value is "0" can indicate that the assignment message is a standard sticky assignment such that assignments comprised thereby should replace existing assignments. Additionally, if the designator bit has a value of "1," such can indicated that the assignment message is a supplemental assignment message and assignments therein should be added to existing resource assignments. As will be appreciated by one skilled in the art, the designator bit can be designed to provide an active low indication of supplemental/ non-supplemental status, whereby a designator bit of "1" (e.g., high) can indicate non-supplemental status while a zero value can indicate supplemental status, as desired with regard to system design goals and the like.

System 800 can additionally comprises a memory 812 and a processor 814 as detailed above with regard to FIG. 7. Moreover, an AI component 816 can be operatively associated with assignment component 802 and can make inferences regarding resource allocation in view of overhead cost considerations, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, AI component 816 can infer an appropriate supplemental assignment message based at least in part on, for instance, detected available system resource blocks. According to this example, it can be determined that a user requires three additional system resource blocks, such as channels, frequencies, and the like. AI component 816, in conjunction with processor 814 and/or memory 812, can determine that blocks 7, 8, 10, 14, 15, and 16 are available to supplement resources already assigned to the user's device 810. AI component 816 can infer that a supplemental assignment message such as [14, 3: 1] is more cost-efficient than a longer supplemental assignment message such as {7, 8, 10: 1}. In such a case, AI component 816 can facilitate proactive generation of a supplemental assignment message in the cheapest (e.g., smallest, . . . ) manner possible to mitigate transmission costs.

According to a related example, AI component 816 can determine that channel 9 is already assigned to the user. In this case, AI component 816 can infer that a supplemental message such as [7, 4: 1] is a most efficient message. Although such a supplemental assignment message can require a similar number of bits for transmission as a supplemental message such as [14, 3: 1], [7, 4: 1] results in a tighter resource grouping, which in turn can aid in resource management when a large number of users and resources are being coordinated.

Figure 9:
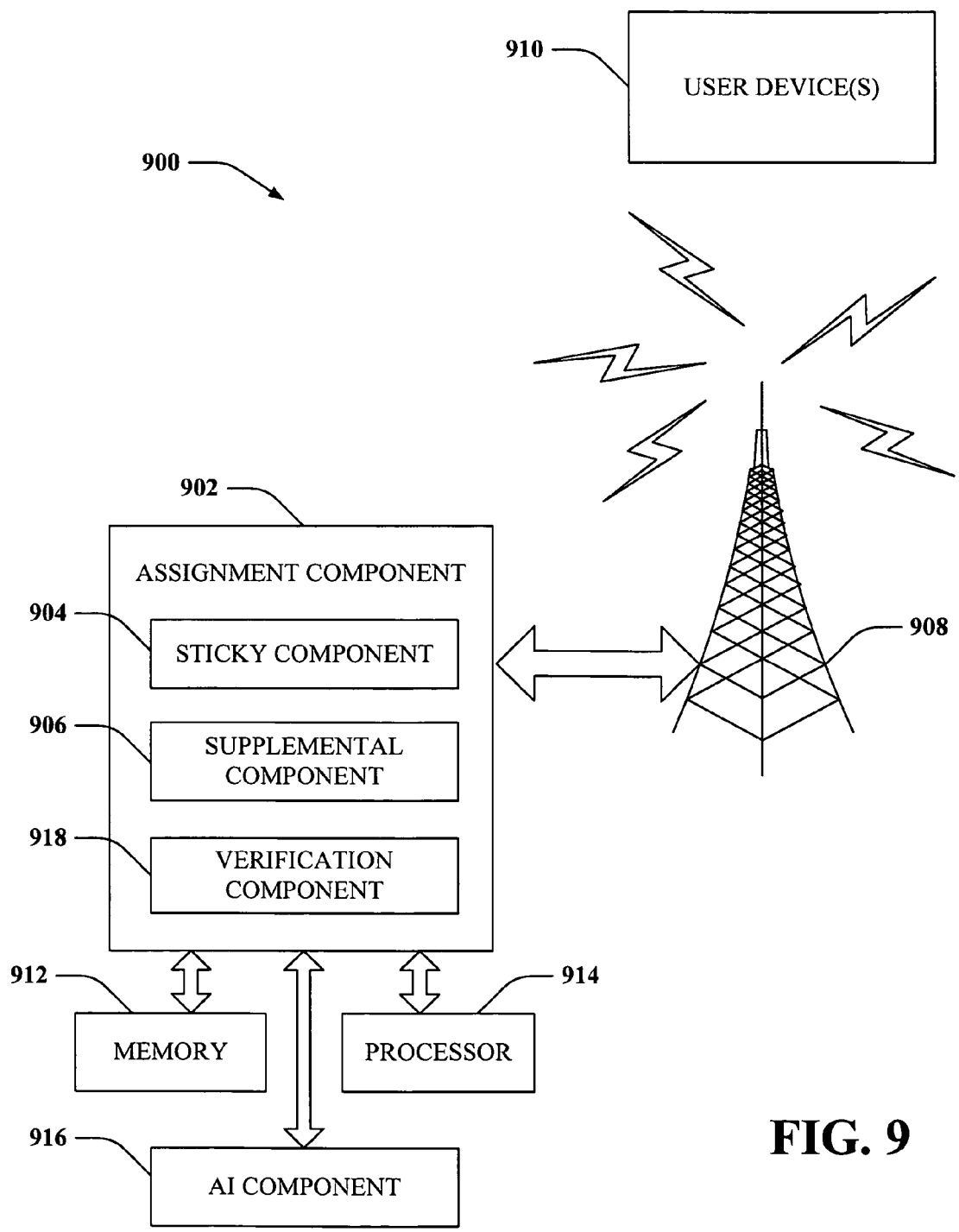
FIG. 9 illustrates a system that facilitates assigning system resources to a user at minimal overhead cost.

FIG. 9 illustrates a system 900 that facilitates assigning system resources to a user at minimal overhead cost. System 900 comprises an assignment component 902 that can assign resources, such as frequencies, channels, transmission time slots, etc., to one or more user devices 910 by way of one or more base stations 908 in a communications network. Assignment component 904 can comprise a sticky component that provides non-supplemental assignments and a supplemental component 906 that can generate supplemental assignments as described herein with regard to preceding figures. Assignment component 902 is additionally operatively coupled to each of a memory 912, a processor 914, and an AI component 916, each of which can in turn be operatively coupled to the other.

The assignment component 902 can additionally comprise a verification component 918 that receives validation data from one or more user devices 910 via one or more base stations 908. According to this scenario, user devices 910 can comprise transceiving functionality in order to transmit validation information back to assignment component 902. Such validation data can be, for instance, a verification message indicating successful packet or sequence decode over a reverse link, an acknowledgement (ACK) of successful assignment receipt and/or decode over a forward link, and the like. Such a verification message can be generated by a verification component (not shown) associated with the user device(s), etc., which can recognize a successful resource assignment, receipt of a message conveying assignment information and the like. In this manner, system 900 can validate an assignment to a user prior to supplementing the assignment with a signal generated by supplemental component 906.

Figure 10:
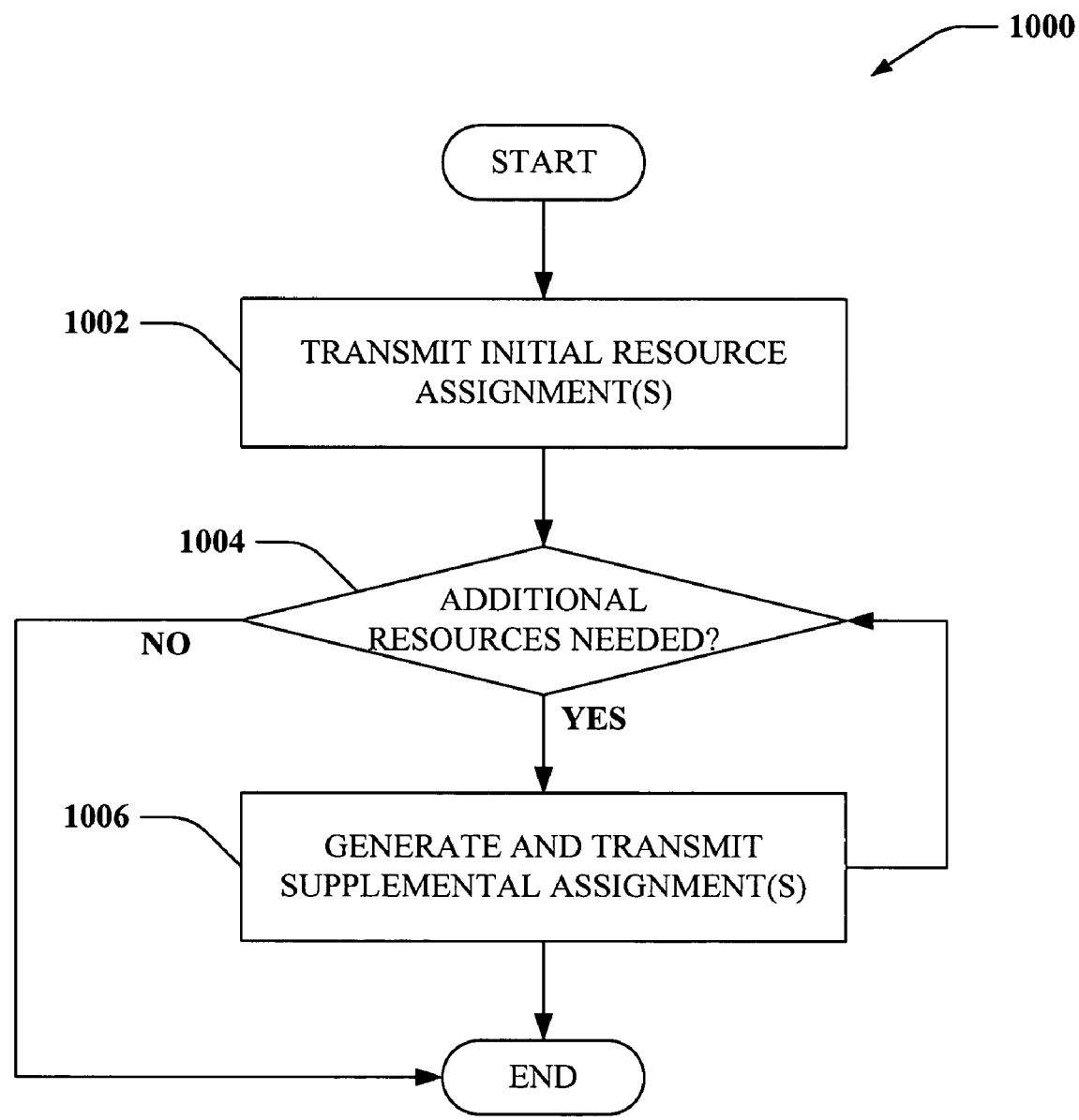
FIG. 10 illustrates a methodology for generating and providing supplemental system resource assignments to users of a wireless network.
Figure 11:
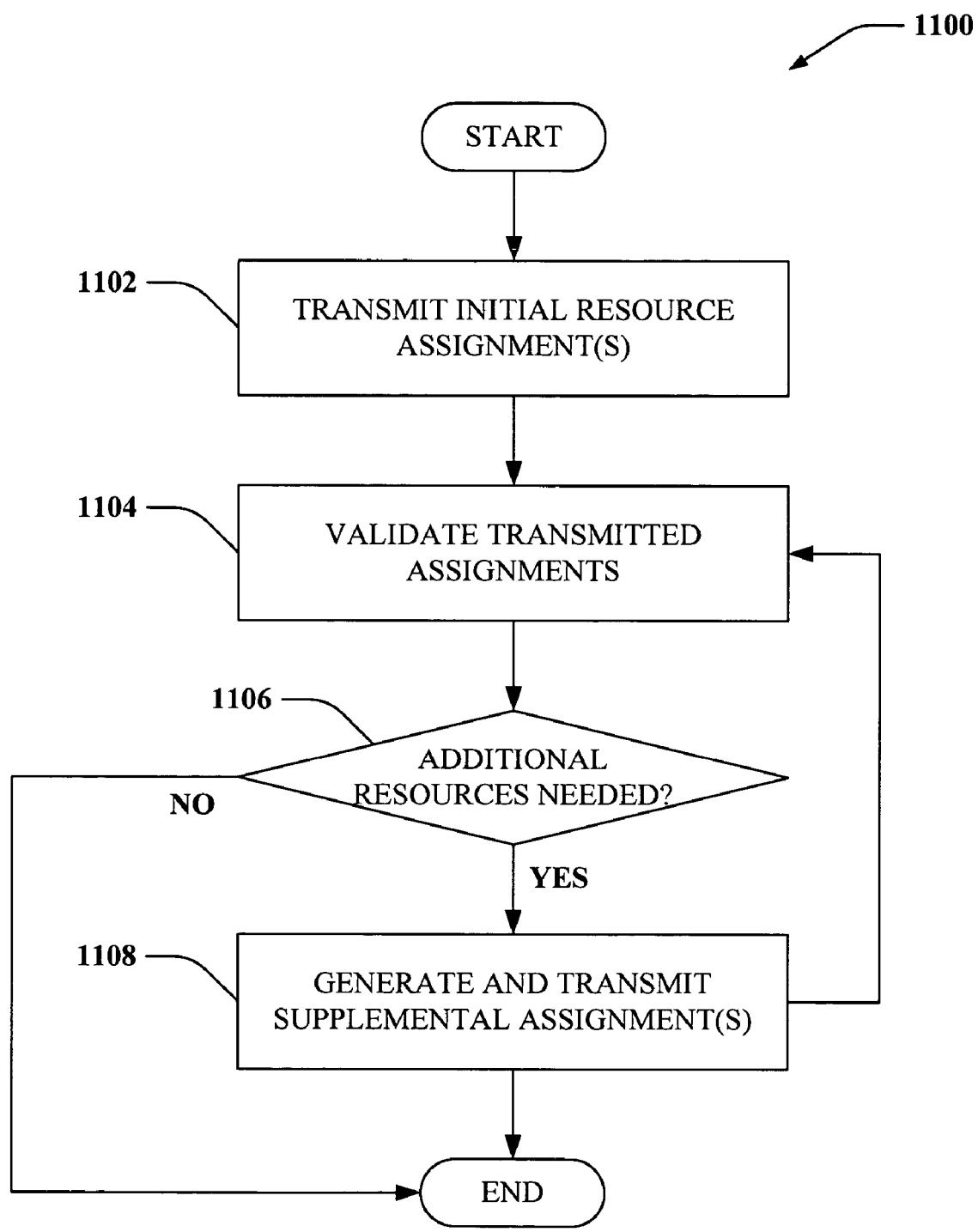
FIG. 11 illustrates a methodology for generating and transmitting supplemental assignments to a user in a wireless network environment is illustrated.
Figure 12:
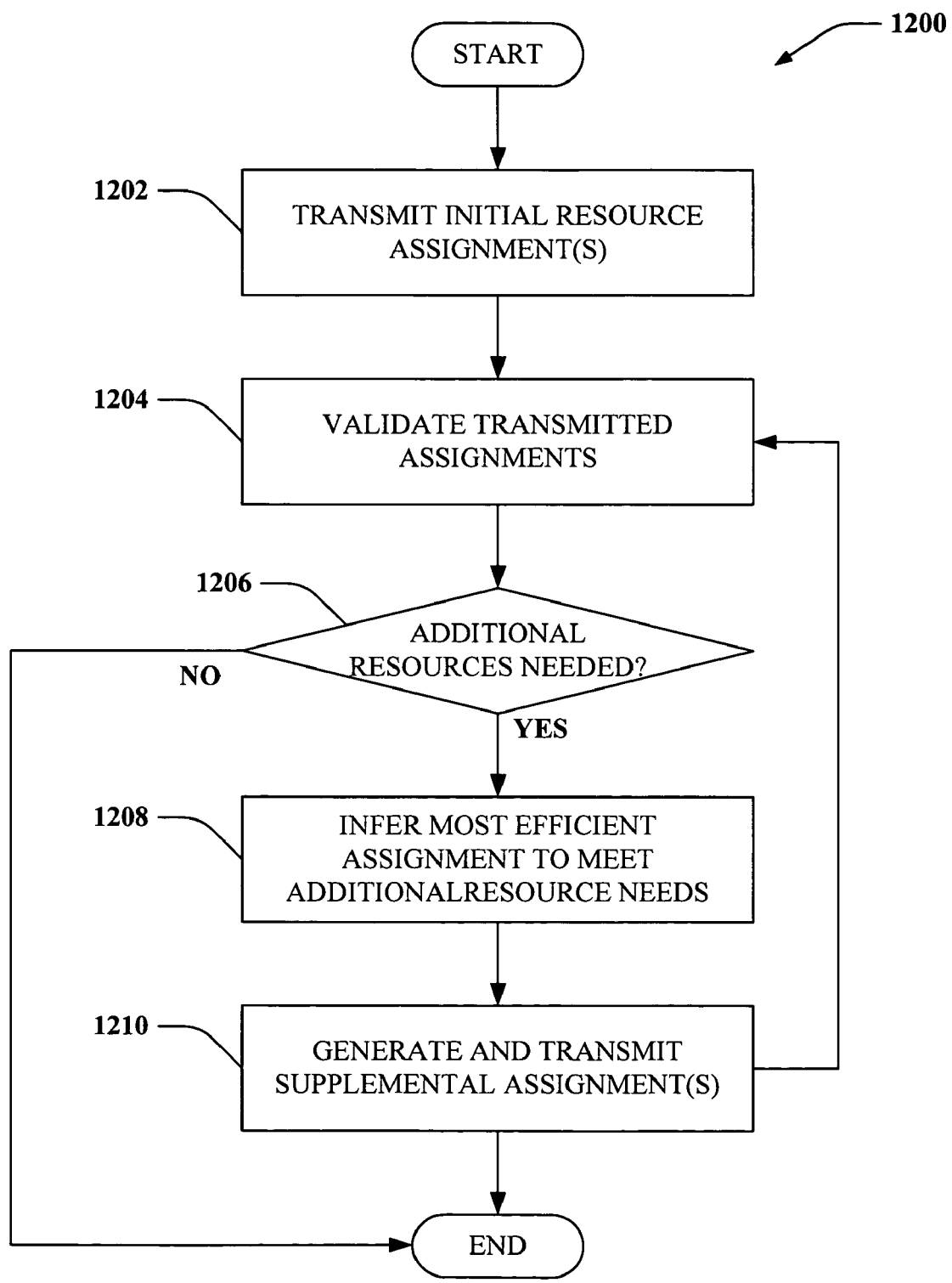
FIG. 12 is an illustration of a methodology for providing supplemental resource assignments to devices communication over a wireless network.

Referring to FIGS. 10-12, methodologies relating to generating supplemental system resource assignments are illustrated. For example, methodologies can relate to supplemental assignments in an OFDM environment, an OFDMA environment, a CDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Referring now solely to FIG. 10, a methodology 1000 for generating and providing supplemental system resource assignments to users of a wireless network. The methodology 1000 can permit the use of efficient channel assignment techniques while avoiding primary limitations of such techniques. Through utilization of supplemental resource assignments, a network can closely match a user's resource assignment to the user's needs and enable the network to optimize usage of system resources, even when subsets of assignable resources are restricted by assignment message format. Additionally, by using supplemental assignment messages, the method 1000 can reduce a number of assignment messages required to be communicated to achieve a desired resource allocation. For instance, if a network needs to increase resources assigned to a particular user, a supplemental assignment can be employed to assign available resources addressable by an assignment message. Conventional systems/methods require a non-supplemental message to be sent to a user when a change to user resources is needed, which typically triggers a plurality of additional assignment and/or deassignment messages to be sent to a plurality of other users to make room for the desired assignment to the targeted user. Supplemental assignments permit resource allocation changes to be accomplished in a single message, whereas non-supplemental assignment reallocation messages require a message to be sent to at least two users (e.g., at least two messages).

In order to facilitate utilization of supplemental resource assignments, at 1002, initial resource assignments can be generated and transmitted to one or more users' devices throughout the network. For example, assignments can be non-supplemental assignments of resources such as network frequencies, channels, time slots, etc. Additionally such assignments can be sticky assignments in order to facilitate minimizing a number of total assignments that need to be transmitted over the network over time. Once assignments have been transmitted to users of the network, the network can be monitored to determine whether any users require additional resources at 1004. Upon a determination that a user requires resource assignment in addition to the user's existing assignments, a supplemental assignment can be generated for the user and transmitted to the user's communications device at 1006. Once the supplemental assignment has been transmitted, the method can revert to 1004 for continued monitoring and/or determination of whether additional resources are required by any users, which can then trigger generation and transmission of further supplemental resource assignments at 1006.

For example, the user can initially be assigned resource blocks 1-5 at 1002. If the user requires additional resources, the determination at 1004 can detect such requirement, and at 1006 such resource assignments are generated in a manner that facilitates reducing system overhead with regard to assignment message size, etc. For example, generation of a supplemental assignment can comprise first determining which resources (and/or resource blocks) are available. Upon such assessment, a supplemental assignment can be generated and can be flagged as such to permit the network and/or receiving device to identify the assignment as supplemental. For instance, if it is determined that resource blocks 11 and 12 are available for assignment to the user, then a supplemental message assigning only blocks 11 and 12 can be generated at 1106. The message can be suitable tagged as "supplemental" to ensure that blocks 11 and 12 are added to assigned blocks 1-5 rather than replace such blocks.

Tagging an assignment message can be facilitated by appending a designator bit to all assignment messages, whether supplemental or non-supplemental, such that the value of the designator bit informs the recipient device and/or the network that the subject assignment should either replace an existing assignment or should augment it. For example, a designator bit has a value of "0" can indicate that the assignment is non-supplemental, while a value of "1" can indicate that the assignment is supplemental. It will be appreciated that the values of the designator bit can be inverted, so long as such values are consistently applied to denote each of the two possible statuses of an assignment message (e.g., supplemental and non-supplemental). Moreover, designation of an assignment as such is not limited to employment of a designator bit, but rather can be effected using any suitable indicator(s) (e.g., a bit sequence, a message prefix, a flag in a message header, . . . ).

Turning now to FIG. 11, a methodology 1100 for generating and transmitting supplemental assignments to a user in a wireless network environment is illustrated. At 1102, initial resource allocations can be transmitted to users of the network. For instance, non-supplemental assignment messages can be generated and transmitted to individual user devices, which need not be aware of assignments to other devices. At 1104, mobile devices can provide a validation signal to the network to verify successful decoding and acceptance of the assigned resource message. At 1106, a determination can be made regarding whether one or more mobile devices require additional system resources. If the determination is that no additional resources are required, then the method can terminate.

If, at 1106, it is determined that additional resources are required by the device, then at 1108 such resources can be allocated with a supplemental assignment. For example a mobile device such as a cellular phone can receive an initial resource allocation at 1102 that permits voice transmission. The determination at 1106 can indicate that a user of the mobile device is attempting to download a web page, transmit a digital photograph or video clip, etc., which can require additional transmission bandwidth. Thus, at 1108, a supplemental resource assignment can be generated to meet bandwidth needs of the device, and can be transmitted to the device to meet device needs.

According to a related example, if the device initially verified receipt and/or acceptance of resource blocks 100-104 and requires an additional four resource blocks, then a supplemental assignment message such as [X, 4: 1] can be transmitted to the device, where X is an integer representing a first resource block in a first contiguous set of available resource blocks. Because all previous resource assignments have been validated at 1104, a complete list of available resources can be known for supplemental assignment generation and transmission at 1108. After supplemental assignment transmission at 1108, the method can revert to 1104 for another iteration of assignment verification, which can include verification of supplemental assignments, prior to network monitoring to determine whether subsequent supplemental assignments are necessary for one or more users at 1106. It will be appreciated that supplemental resource assignment messages need not comprise contiguous resource assignments, but that such assignments can be expressed in a manner (e.g., a block index array, . . . ) that facilitates generation of a convenient and cost-effective assignment message. For example, such messages can be expressed with two indices and a designator bit.

Referring now to FIG. 12, a methodology 1200 for providing supplemental resource assignments to devices communication over a wireless network. At 1202, initial resource allocations can be made and assignments can be transmitted to one or more devices using the network. For instance, a first user can be assigned resource blocks by way of a non-supplemental sticky assignment such as {1, 2, 3, 6, 7, 10: 0}, while a second user can be assigned resource blocks according to a second non-supplemental assignment message such as {4, 5, 8: 0}, where ":0" represents a designator bit identifying the assignment message as non-supplemental. Users need not be aware (e.g., need not view) other users' assignment messages. At 1204, assignment messages can be validated by recipient mobile devices. For instance, a simple acknowledgement message can be transmitted to the network verifying receipt, successful decoding, and/or acceptance of the assignment message. In this manner, the network can be apprised of precisely which resources remain available for supplemental assignment, etc. At 1206, a determination can be made regarding which, if any, devices require additional system resources. If no additional resources are required, the method can terminate. If additional resources are required by one or more devices, then the message can proceed to 1208. For example, the first user described above can require an additional three resource blocks for an operation over the network. A most efficient supplemental message format can be inferred at 1208 to provide supplemental assignments to the first user at a lowest overhead cost (e.g., based on cost-benefit analysis, optimization techniques, . . . ).

For example, if all initial resource block assignments have been validated as of 1204, then the next three available resource blocks can be known to be blocks 7, 9, and 11. A supplemental assignment message comprising assignments of these blocks can be represented as {7, 9, 11: 1} and can be transmitted to the first user at 1210. However, a more efficient message (e.g., shorter message) can be [9, 4: 1], which transmits supplemental resource assignments of four contiguous resource blocks beginning with block 9. Since block 10 is already assigned to the first user's device, there is no conflict, and new blocks 9, 11, and 12 will additionally be assigned to the first user to meet the user's resource needs. Inferences can be made at 1208 (e.g., using artificial intelligence techniques, machine-learning techniques, . . . ) that can facilitate a determination that the more efficient (e.g., cheaper) message is desirable, and such can be selected for generation and transmission at 1210.

According to a similar example, it can be determined at 1204 that a second user failed to verify receipt/acceptance of its initial assignment message. So long as such resource blocks are still available (e.g., have not been assigned to a third or subsequent user device), they can be assigned to the first user in a supplemental assignment message such as {4, 5, 8: 1}. Only the first user need be aware of the supplemental assignment, as supplemental assignments can be transparent to all users but the recipient in order to still further reduce network overhead, processing time, etc. Additionally, at 1208, it can be inferred that the supplemental assignment message can be reduced to a contiguous assignment such as [4, 5: 1], where "4" represents a first resource block, "5" represents a contiguous series of blocks that begins with "4", and ":1" designates the message as supplemental. Such is permissible because it is known that blocks 6 and 7 are already assigned to the first user, such that the more efficient contiguous supplemental assignment does not conflict with the first user's existing assignments. In this manner, inferences made at 1208 can facilitate generation and transmission of a supplemental assignment message at 1210 that is most cost-efficient with respect to overhead requirements and/or assignment transmission message size.

Figure 13:
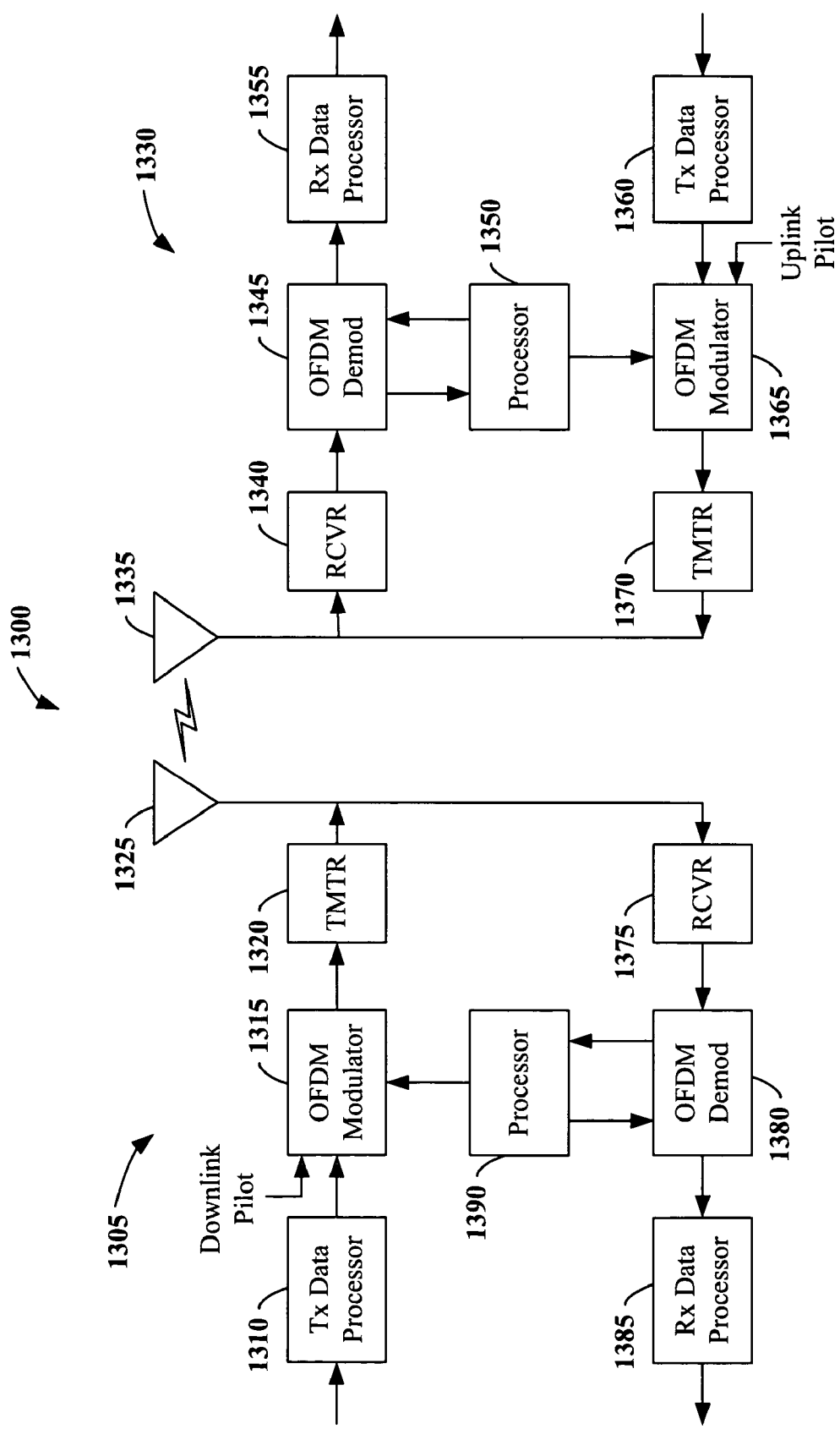
FIG. 13 is an illustration of a wireless network environment that can be employed in conjunction with the various systems and methods described herein.

FIG. 13 shows an exemplary wireless communication system 1300. The wireless communication system 1300 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 6-9) and/or methods (FIGS. 9-12) described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). An OFDM modulator 1315 receives and processes the data symbols and pilot symbols and provides a stream of OFDM symbols. An OFDM modulator 1320 multiplexes data and pilot symbols on the proper subbands, provides a signal value of zero for each unused subband, and obtains a set of N transmit symbols for the N subbands for each OFDM symbol period. Each transmit symbol may be a data symbol, a pilot symbol, or a signal value of zero. The pilot symbols may be sent continuously in each OFDM symbol period. Alternatively, the pilot symbols may be time division multiplexed (TDM), frequency division multiplexed (FDM), or code division multiplexed (CDM). OFDM modulator 1320 can transform each set of N transmit symbols to the time domain using an N-point IFFT to obtain a "transformed" symbol that contains N time-domain chips. OFDM modulator 1320 typically repeats a portion of each transformed symbol to obtain a corresponding OFDM symbol. The repeated portion is known as a cyclic prefix and is used to combat delay spread in the wireless channel.

A transmitter unit (TMTR) 1320 receives and converts the stream of OFDM symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. An OFDM demodulator 1345 removes the cyclic prefix appended to each OFDM symbol, transforms each received transformed symbol to the frequency domain using an N-point FFT, obtains N received symbols for the N subbands for each OFDM symbol period, and provides received pilot symbols to a processor 1350 for channel estimation. OFDM demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by OFDM demodulator 1345 and RX data processor 1355 is complementary to the processing by OFDM modulator 1315 and TX data processor 1310, respectively, at access point 1300.

On the uplink, a TX data processor 1360 processes traffic data and provides data symbols. An OFDM modulator 1365 receives and multiplexes the data symbols with pilot symbols, performs OFDM modulation, and provides a stream of OFDM symbols. The pilot symbols may be transmitted on subbands that have been assigned to terminal 1330 for pilot transmission, where the number of pilot subbands for the uplink may be the same or different from the number of pilot subbands for the downlink. A transmitter unit 1370 then receives and processes the stream of OFDM symbols to generate an uplink signal, which is transmitted by the antenna 1335 to the access point 1310.

At access point 1310, the uplink signal from terminal 1330 is received by the antenna 1325 and processed by a receiver unit 1375 to obtain samples. An OFDM demodulator 1380 then processes the samples and provides received pilot symbols and data symbol estimates for the uplink. An RX data processor 1385 processes the data symbol estimates to recover the traffic data transmitted by terminal 1335. A processor 1390 performs channel estimation for each active terminal transmitting on the uplink. Multiple terminals may transmit pilot concurrently on the uplink on their respective assigned sets of pilot subbands, where the pilot subband sets may be interlaced.

Processors 1390 and 1350 direct (e.g., control, coordinate, manage, etc.) operation at access point 1310 and terminal 1335, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access OFDM system (e.g., an orthogonal frequency division multiple-access (OFDMA) system), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of dynamically allocating system resources in a wireless networking environment, comprising:
    transmitting a persistent non-supplemental assignment to at least one mobile device connected to a wireless network to assign an initial set of resources to the at least one mobile device;
    determining whether the at least one mobile device requires additional resources;
    generating a supplemental assignment that assigns at least one additional resource to the at least one mobile device; and
    transmitting the supplemental assignment to the at least one mobile device to augment a resource set assigned to the at least one mobile device.

2. The method of claim 1, generating the supplemental assignment comprises assessing a set of all resources and determining a subset of available resources.

3. The method of claim 1, further comprising selecting available resources from the subset of available resources for supplemental assignment that minimize supplemental assignment message size.

4. The method of claim 3, further comprising selecting contiguous resources when more than one additional resource is required to supplement an assignment for the at least one mobile device.

5. The method of claim 4, further comprising generating a contiguous supplemental assignment for the at least one mobile device.

6. The method of claim 3, further comprising generating a non-contiguous supplemental resource assignment when fewer than three additional resources are required to supplement an assignment of the at least one mobile device.

7. The method of claim 1, further comprising verifying receipt of the persistent non-supplemental assignment.

8. The method of claim 7, verification of receipt of the persistent non-supplemental assignment comprises transmitting a verification message from the at least one mobile device to the network.

9. The method of claim 8, further comprising providing an indication in the verification message that the persistent non-supplemental assignment was successfully received and decoded over a reverse link.

10. The method of claim 8, further comprising providing an acknowledgement in the verification message that the persistent non-supplemental assignment was successfully received and decoded over a forward link.

11. A system that facilitates supplementing resource assignments for mobile devices, comprising:
 an assignment component that generates non-supplemental resource assignments for a plurality of respective mobile devices, wherein the non-supplemental resource assignments are persisted until a subsequent non-supplemental resource assignment is received by the mobile device to which the assignment corresponds;
 a supplemental component that receives information related to increased resource requirements of at least one of the plurality of mobile devices and generates a supplemental assignment to allocate additional resources to satisfy the increased resource requirements of the at least one mobile device; and
 a transceiver that transmits assignment messages to the plurality of mobile devices.

12. The system of claim 11, the supplemental component generates supplemental resource assignments when the assignment component employs a message format that limits resource subset assignability.

13. The system of claim 12, the message format is at least one of a contiguous block assignment technique, a channel table assignment technique, and a known-user-order assignment technique.

14. The system of claim 13, the supplemental component generates supplemental assignments in a format comprising at least one of a block index list and a contiguous block of resources.

15. The system of claim 11, further comprising a verification component that receives verification messages, through the transceiver, from mobile devices indicating receipt and successful decode of non-supplemental assignments.

16. The system of claim 15, the verification component rejects resource assignments to mobile devices that do not transmit verification messages, and rejected assigned resources retain available status.

17. The system of claim 11, further comprising an artificial intelligence (AI) component that makes inferences related to optimization of supplemental assignment generation with regard to transmission costs.

18. The system of claim 17, the AI component infers a most efficient supplemental message format based at least in part on information related to resource availability at the time of supplemental assignment generation.

19. The system of claim 11, a resource is at least one of a transmission channel, a frequency, a transmission time slot, and a code slot.

20. The system of claim 11, a mobile device comprises a wireless communication device.

21. The system of claim 11, a mobile device is at least one of a cellular phone, a laptop, and a PDA.

22. An apparatus that facilitates wireless network resource management, comprising:
 means for transmitting a persistent non-supplemental assignment to at least one mobile device connected to a wireless network to assign an initial set of resources to the at least one mobile device;
 means for determining whether the at least one mobile device requires additional resources;
 means for generating a supplemental resource assignment that assigns at least one additional resource to the at least one mobile device; and
 means for transmitting the supplemental assignment to the at least one mobile device to augment a resource set assigned to the at least mobile device.

23. The apparatus of claim 22, the means for generating a supplemental resource assignment comprises means for assessing all resources in the wireless network and identifying a subset of available resources.

24. The apparatus of claim 23, the means for generating a supplemental resource assignment further generates the supplemental assignment in a message having a format that minimizes transmission overhead costs.

25. The apparatus of claim 24, the message describes supplemental resources in contiguous format when more than one additional resource is required by the at least one mobile device and when sufficient contiguous resources are available.

26. The apparatus of claim 24, the message describes supplemental resources in block index list format when the at least one mobile device requires fewer than three additional resources or when sufficient contiguous resources are not available to accommodate the detected resource insufficiency at the at least one mobile device.

27. The apparatus of claim 22, further comprising means for verifying that an assignment has been received and successfully decoded by the at least one mobile device.

28. The apparatus of claim 27, further comprising means for identifying resources described in verified assignments as unavailable resources to mitigate conflicting assignment of the resources.

29. A computer-readable medium having stored thereon computer-executable instructions for:
 providing initial persistent non-supplemental assignments to devices communicating over a wireless network that are persisted until supplemented or replaced;
 assessing resource assignments to the devices communicating over the wireless network;
 determining whether a device requires additional resources; and
 providing a supplemental resource assignment to the device that augments an existing persistent resource assignment to the device without requiring a complete replacement assignment.

30. The computer-readable medium of claim 29, further comprising computer-executable instructions for verifying receipt of an initial persistent non-supplemental assignment by a device before permitting a supplemental assignment to be transmitted to the device.

31. The computer-readable medium of claim 29, further comprising computer-executable instructions for assessing available resources for supplemental assignment and selecting a supplemental subset of resources that minimizes supplemental assignment message size.

32. A microprocessor that executes instructions for supplementing a resource assignment to a device communicating over a wireless network, the instructions comprising:
 providing an initial persistent non-supplemental resource assignment to the device;
 detecting an increased resource requirement for the device; and
 generating and transmitting a supplemental resource assignment to the device that augments the initial non-supplemental resource assignment to the device.

33. A mobile device that facilitates communicating over a wireless network, comprising:
- a component that receives an initial persistent resource assignment and asserts control over resources identified in the initial persistent non-supplemental resource assignment; and
- a component that provides an indication of increased resource requirements, receives a supplemental resource assignment, and asserts control over one or more resources in the supplemental resource assignment to augment a set of resources assigned to the mobile device by the initial persistent resource assignment.

34. The mobile device of claim 33, wherein the mobile device is at least one of a cellular phone, a smartphone, a laptop, a satellite radio, a GPS device, a handheld computing device, a handheld communication device, and a PDA.

35. The mobile device of claim 33, further comprising a verification component that generates a verification message to indicate receipt of a resource assignment and transmits over the wireless network.

36. The mobile device of claim 35, the verification message indicates whether resources identified in the resource assignment have been successfully assigned to the mobile device.

37. The mobile device of claim 35, the resource assignment is at least one of the initial persistent resource assignment and the supplemental resource assignment.

38. The mobile device of claim 33, the initial persistent resource assignment is a persistent assignment that is retained by the mobile device until receipt of at least one of a new persistent assignment and a supplemental resource assignment.

39. The mobile device of claim 33, wherein the mobile device provides an indication of an increased resource requirement to the wireless network to invoke the supplemental resource assignment.

40. A mobile device microprocessor that executes instructions for supplementing a resource assignment to the mobile device when communicating over a wireless network, the instructions comprising:
- receiving an initial persistent non-supplemental resource assignment;
- indicating an increased resource requirement; and
- receiving a supplemental resource assignment; and
- integrating resources identified in the supplemental resource assignment to a resource set identified in the initial persistent non-supplemental resource assignment.

41. A method of securing resources for utilization by a mobile device, comprising:
- receiving an initial persistent non-supplemental resource assignment at the mobile device;
- asserting control over resources identified in the persistent non-supplemental resource assignment;
- providing an indication of increased resource requirements;
- receiving a supplemental resource assignment; and
- asserting control over resources identified in the supplemental resource assignment to augment a resource set obtained from the non-supplemental assignment.

* * * * *